United States Patent [19]
Chaiken

[11] Patent Number: 6,128,732
[45] Date of Patent: Oct. 3, 2000

[54] IMPLEMENTING UNIVERSAL SERIAL BUS SUPPORT WITH A MINIMUM OF SYSTEM RAM

[75] Inventor: Craig L. Chaiken, Tomball, Tex.

[73] Assignee: Compaq Computer Corporation, Houston, Tex.

[21] Appl. No.: 08/990,550

[22] Filed: Dec. 15, 1997

[51] Int. Cl.[7] ................................................. G06F 9/24
[52] U.S. Cl. ............................................................ 713/2
[58] Field of Search ................................. 395/651, 652, 395/653, 800.01, 750.03, 183.12, 750.01, 113; 713/1, 2, 100, 300, 320, 323, 324; 712/10; 714/36; 711/152, 163

[56] References Cited

U.S. PATENT DOCUMENTS

| | | | |
|---|---|---|---|
| 5,497,494 | 3/1996 | Combs et al. | 395/750 |
| 5,511,204 | 4/1996 | Crump et al. | 395/750 |
| 5,603,038 | 2/1997 | Crump et al. | 395/750 |
| 5,630,142 | 5/1997 | Crump et al. | 395/750 |
| 5,694,583 | 12/1997 | Williams et al. | 395/500 |
| 5,799,196 | 8/1998 | Flannery | 395/750.03 |
| 5,818,948 | 10/1998 | Gulick | 381/77 |
| 5,819,087 | 10/1998 | Le et al. | 395/652 |

*Primary Examiner*—Albert De Cady
*Assistant Examiner*—Omar A. Omar
*Attorney, Agent, or Firm*—Akin, Gump, Strauss, Hauer & Feld, LLP

[57] ABSTRACT

A computer system that implements communication support with a minimum amount of main memory. The computer system provides a Basic Input/Output System (BIOS) for execution in Random Access Memory (RAM). Included in the BIOS is the communication initialization and runtime code. Upon initialization, the communication initialization code is executed, configuring and initializing communication devices, including a Universal Serial Bus (USB) device. After the initialization, the runtime communication code is moved to a secure memory, such as System Management Mode (SMM) memory. The runtime communication code is executed in response to an interrupt to the secure memory. If the secure memory is SMM memory, then a SMI will trigger the execution of the communication code. The main memory is not accessed to execute the runtime communication code.

27 Claims, 7 Drawing Sheets

IMPLEMENTING UNIVERSAL SERIAL BUS SUPPORT WITH A MINIMUM OF SYSTEM RAM

BACKGROUND OF THE INVENTION

1. Field of the Invention

The present invention relates to minimizing the runtime code present in the Random Access Memory (RAM), and more specifically to minimizing the runtime code necessary to support a communication standard such as the Universal Serial Bus (USB).

2. Description of the Related Art

Computers are becoming increasingly important in many aspects of life, including homes and businesses. As computers become more important, more advances in computer capabilities are discovered. One such advance was the creation of the Universal Serial Bus (USB). The USB, a serial bus standard, is a communications architecture that allows Personal Computer (PC) users the ability to connect multiple peripherals through a single port while also providing digital telephony capabilities. The USB was designed as an alternative to the legacy PS/2 and RS-232 standards. The USB, a simple two-wire serial communications link, operates at 12 megabits per second (Mbps) and offers both asynchronous and isochronous data transfer. The USB protocols automatically configure a device at startup or when a device is implemented as hot "Plug and Play", that is the device is connected/disconnected or plugged in at run time. Devices such as keyboards, mice, and printers can be connected via the USB. Communication on the USB is bi-directional, with downstream communication toward the device and upstream communication toward the PC.

USB legacy mode support allows a USB keyboard or mouse to transparently replace a PS/2 keyboard or mouse to achieve a high level of compatibility. The USB legacy mode support uses hardware emulation to achieve this compatibility. USB legacy mode support requires a compatible USB host controller. The host controller routes data from the USB devices to the legacy interface, such as a keyboard controller.

USB code is generally contained in the Basic Input/Output System (BIOS) code stored in the BIOS Read Only Memory (ROM). The BIOS code contains the system programs, which interface between the hardware and applications software. After startup, the BIOS code is copied or "shadowed" to a system Random Access Memory (RAM) for quicker and easier access by the computer system. Most RAM access speeds are at least three times as fast as ROM access speeds. To shadow a ROM into a RAM, software is generally used to copy the data from the ROM into the RAM. A memory controller then maps the RAM address space to the ROM address space. This allows the RAM and ROM to occupy the same physical address so that no address alteration routines are necessary. Once shadowed, a BIOS call to a specific ROM address accesses the RAM address, but the RAM address possesses the same data as the ROM. Once the BIOS code is shadowed to the system RAM, the compressed BIOS code is decompressed if necessary.

The BIOS code can be separated in two categories: initialization code and runtime code. Initialization code is executed when the system is initialized at startup and can be implemented to configure a device or a section of the system. Runtime code is executed by the computer system after startup, upon demand, when that specific program in necessary to the operation of the computer system. Because of the limited size of the system RAM and the desirability of leaving space in the system RAM for execution of software applications, the computer system typically removes the initialization code from the system RAM after the initialization code has been executed, thus leaving only runtime code.

Certain microprocessors, such as the Pentium® processor from Intel Corporation, have included a system management mode (SMM), which is entered upon receipt of a system management interrupt (SMI). SMM code, including initialization and runtime code, can be contained in the BIOS ROM, shadowed to a secure memory space, and decompressed. Originally, SMIs were power management interrupts devised by Intel Corporation for portable systems. Portable computers often draw power from batteries which provide a limited amount of energy. To maximize battery life, an SMI is typically asserted to turn off or reduce the power to any system component not in use. Although originally meant for laptop computers, SMIs have become popular for desktop and other stationary computers as well.

SMIs are asserted by an SMI timer, by a system request, or by other means. Briefly, an SMI is a non-maskable interrupt having almost the highest priority in the system. Only the reset signal R/S* and cache flush signal FLUSH*, which can be conceptualized as interrupts, have a higher priority than the SMI. When an SMI is asserted, a microprocessor maps a portion of memory referred to as the system management mode memory ("SMM memory") into the main memory space. The entire system state is then saved in the SMM memory in a stack-like, last in/first out fashion. After the initial system state is saved, the processor begins executing an SMI handler routine, which is an interrupt service routine to perform specific system management tasks such as reducing power to specific devices. While the routine is executed, other interrupt requests are not serviced, and are ignored until the interrupt routine is completed or the system is reset. When the SMI handler completes its task, the system state is retrieved from the SMM memory, and the main program continues. An SMI active signal referred to as the SMIACT* signal is provided by the processor to indicate operation in SMM.

As mentioned, following assertion of its SMI input (this is generally an active low signal), the processor calls the SMI handler, which addresses an address space that is separate from ordinary main memory. Thereafter, all memory accesses refer only to SMM memory. Input/output ("I/O") accesses via instructions such as IN or OUT are still directed to the normal I/O address space, however. One advantageous side-effect of the hardwired separate address SMM area is that the routines stored in this space cannot be snooped by the cache.

In a typical system management mode implementation, it is intended that battery-buffered SRAM chips be mapped into the address space between 30000h and 3fffh by default. External hardware can use the SMIACT* signal as a chip select signal and thereby address either the SRAM chips (the SMIACT* signal is at a logic low level), or the normal main memory (the SMIACT* signal is at a logic high level). By using the SMIACT* signal, then, SMM memory and normal memory can be strictly separated.

Certain microprocessors are more flexible than earlier processors in that the SMI handler starting address and the location of the SMM memory space can be changed by the user. Under the Pentium® design for example, the SMI starting address stored in the microprocessor register is initially set to the conventional 30000h value. Consequently, when the first SMI is asserted, the SMI handler starts at address 38000h (the entry point is offset from the SMM memory base). While the SMI handler routine is executing, however, it may provide a different area of memory to be used as the SMM memory. This new SMM memory may start at any location in the main memory space chosen by the programmer. The SMM memory is a 64 or 128 Kbyte block beginning at the new SMM memory start address. When the SMI handler finishes, the new starting address replaces the old starting address in the microprocessor's SMI starting address register.

When the next SMI is asserted, the microprocessor maps the new 64 or 128 Kbyte block of memory into the main memory space as the SMM memory, and starts the SMI handler at the new starting address at the midpoint of the new SMM memory. For example, during the first SMI service routine, the programmer may change the SMM memory starting point from 030000h to B00000h. When the SMI is next asserted, the microprocessor maps the SMM memory into main memory space between B00000h and B0FFFFh. The microprocessor then references address B08000h for the SMI handler. This feature thus allows the programmer to choose a more convenient location in the main memory.

One implementation of an SMI is to trigger execution of the USB runtime code. A computer system can be implemented so that an SMI is generated at a periodic rate by a USB device. The SMI triggers the execution of the USB code contained in the RAM. The SMI event gives control to the SMI handler and the computer system then enters the SMM. The SMI handler determines if the SMI is an USB SMI. If the SMI is an USB SMI, then the computer system books a call on the USB runtime code contained in the BIOS code shadowed in the RAM. This code is executed, then the SMI handler regains control to address any other SMIs. When all SMIs have been addressed, the SMI handler relinquishes control and SMM is exited. This process is repeated at a fixed period to accommodate the USB devices, such as a keyboard. Therefore, any increase in speed of handling SMIs may result in an overall increase in the speed of the computer system.

SUMMARY OF THE INVENTION

A computer system according to the invention implements communication support with a minimum amount of main memory. Communication initialization and runtime code are provided to the BIOS of the computer system. Upon initialization of the computer system, the initialization code is executed, configuring and initializing the communication devices. After the initialization, the runtime communication code is moved from main memory to a secure memory such as system management mode memory, thereby freeing space in the main memory for use by other system resources. The runtime communication code is executed in response to an interrupt to the secure memory. The main memory is not accessed to execute the runtime communication code. Further, the present invention permits the interrupt handler to execute in a more efficient manner.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE PREFERRED EMBODIMENT

Figure 1:
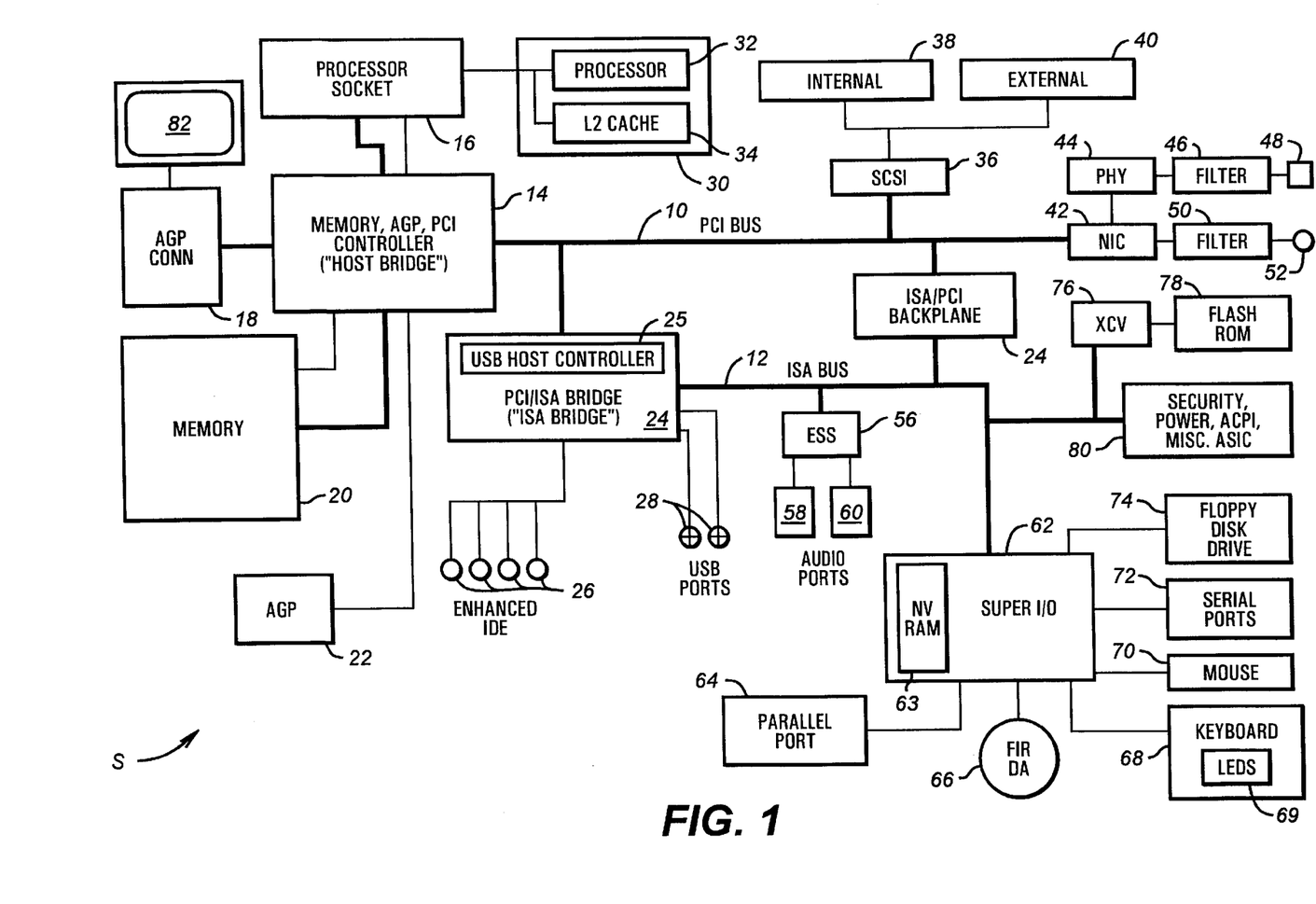
FIG. 1 is a block diagram of the computer system according to the present invention.

Turning to FIG. 1, illustrated is a typical computer system S implemented according to the invention. While this system is illustrative of one embodiment, the techniques according to the invention can be implemented in a wide variety of systems. The computer system S in the illustrated embodiment is a PCI bus/ISA bus-based machine, having a peripheral component interconnect (PCI) bus 10 and an industry standard architecture (ISA) bus 12. The PCI bus 10 is controlled by PCI controller circuitry located within a memory/accelerated graphics port (AGP)/PCI controller 14. This controller 14 (the "host bridge") couples the PCI bus 10 to a processor socket 16 via a host bus, an AGP connector 18, a memory subsystem 20, and an AGP 22. A second bridge circuit, a PCI/ISA bridge 24 (the "ISA bridge") bridges between the PCI bus 10 and the ISA bus 12.

The host bridge 14 in the disclosed embodiment is a 440LX Integrated Circuit by Intel Corporation, also known as the PCI AGP Controller (PAC). The ISA bridge 24 is a PIIX4, also by Intel Corporation. The host bridge 14 and ISA bridge 24 provide capabilities other than bridging between the processor socket 16 and the PCI bus 10, and the PCI bus 10 and the ISA bus 12. Specifically, the disclosed host bridge 14 includes interface circuitry for the AGP connector 18, the memory subsystem 20, and the AGP 22. A video display 82 can be coupled to the AGP connector 18 for display of data by the computer system S. The ISA bridge 24 further includes an internal enhanced IDE controller for controlling up to four enhanced IDE drives 26, and a universal serial bus (USB) host controller 25 for controlling USB ports 28 in accordance with the present invention.

The host bridge 14 is preferably coupled to the processor socket 16, which is preferably designed to receive a Pentium II processor module 30, which in turn includes a microprocessor core 32 and a level two (L2) cache 34. The processor socket 16 could be replaced with processors other than the Pentium II without detracting from the spirit of the invention.

The host bridge 14, when the Intel 440LX Host Bridge is employed, supports a memory subsystem 20 (or main memory) of extended data out (EDO) dynamic random access memory (DRAM) or synchronous DRAM (SDRAM), a 64/72-bit data path memory, a maximum memory capacity of one gigabyte, dual inline memory module (DIMM) presence detect, eight row address strobe (RAS) lines, error correcting code (ECC) with single and multiple bit error detection, read-around-write with host for PCI reads, and 3.3 volt DRAMs. The host bridge 14 support up to 66 megahertz DRAMs, whereas the processor socket 16 can support various integral and nonintegral multiples of that speed.

The ISA bridge 24 also includes enhanced power management. It supports a PCI bus at 30 or 33 megahertz and an ISA bus 12 at ¼ of the PCI bus frequency. PCI revision 2.1 is supported with both positive and subtractive decode. The standard personal computer input/output (I/O) functions are supported, including a direct memory access (DMA) controller, two 82C59 interrupt controllers, an 8254 timer, a real time clock (RTC) with a 256 byte complementary metal oxide semiconductor (CMOS) static RAM (SRAM), and chip selects for system read only memory (ROM), RTC, keyboard controller, an external microcontroller, and two general purpose devices. The enhanced power management within the ISA bridge 24 includes full clock control, device management, suspend and resume logic, advanced configuration and power interface (ACPI), and system management bus (SMBus) control, which is based on the inter-integrated circuit ($I^2C$) protocol.

The PCI bus 10 couples a variety of devices that generally take advantage of a high speed data path. This includes a small computer system interface (SCSI) controller 36, with both an internal port 38 and an external port 40. In the disclosed embodiment, the SCSI controller 36 is a AIC-7860 SCSI controller. Also coupled to the PCI bus 10 is a network interface controller (NIC) 42, which preferably supports the ThunderLan™ power management specification by Texas Instruments. The NIC 42 is coupled through a physical layer 44 and a filter 46 to an RJ-45 jack 48, and through a filter 50 to a AUI jack 52.

Between the PCI Bus 10 and the ISA Bus 12, an ISA/PCI backplane 54 is provided which include a number of PCI and ISA slots. This allows ISA cards or PCI cards to be installed into the system for added functionality.

Further coupled to the ISA Bus 12 is an enhanced sound system chip (ESS) 56, which provides sound management through an audio in port 58 and an audio out port 60. The ISA bus 12 also couples the ISA bridge 24 to a Super I/O chip 62, which in the disclosed embodiment is a National Semiconductor Corporation PC87307VUL device. The Super I/O 62 contains several logical devices, one of which is a Real Time Clock (RTC). Resident in the RTC of the Super I/O chip 62 is non-volatile Random Access Memory (NV RAM) 63. This Super I/O chip 62 provides a variety of input/output functionality, including a parallel port 64, an infrared port 66, a keyboard controller for a keyboard 68, a mouse port for a mouse 70, additional series ports 72, and a floppy disk drive controller for a floppy disk drive 74. These devices are coupled through connectors to the Super I/O 62. Resident on the keyboard 68 are light emitting diodes (LEDs) 69. The floppy disk drive 74 includes disk drives for a 3½" and 5¼" floppy disks and Advanced Technology Attachment Packet Interface (ATAPI) drives, including the LS-120 drives.

The ISA bus 12 is also coupled through bus transceivers 76 to a flash ROM 78, which can include both basic input/output system (BIOS) code for execution by the processor 32, as well as an additional code for execution by microcontrollers in a ROM-sharing arrangement. An exemplary BIOS according to the invention is shown below.

The ISA bus 12 further couples the ISA bridge 24 to a security, power, ACPI, and miscellaneous application specific integrated circuit (ASIC) 80, which provides a variety of miscellaneous functions for the system. The ASIC 80 includes security features, system power control, light emitting diode (LED) control, a PCI arbiter, remote wake up logic, system fan control, hood lock control, ACPI registers and support, system temperature control, and various glue logic.

An additional feature of the computer system S is a System Management Mode (SMM). Configuration of a secure memory, such as SMM memory, within the main memory 20 is well known to those skilled in the art. It is also noted that FIG. 1 presents an exemplary embodiment of the computer system S and it is understood that numerous other effective embodiments could readily be developed as known to those skilled in the art.

Figure 2A:
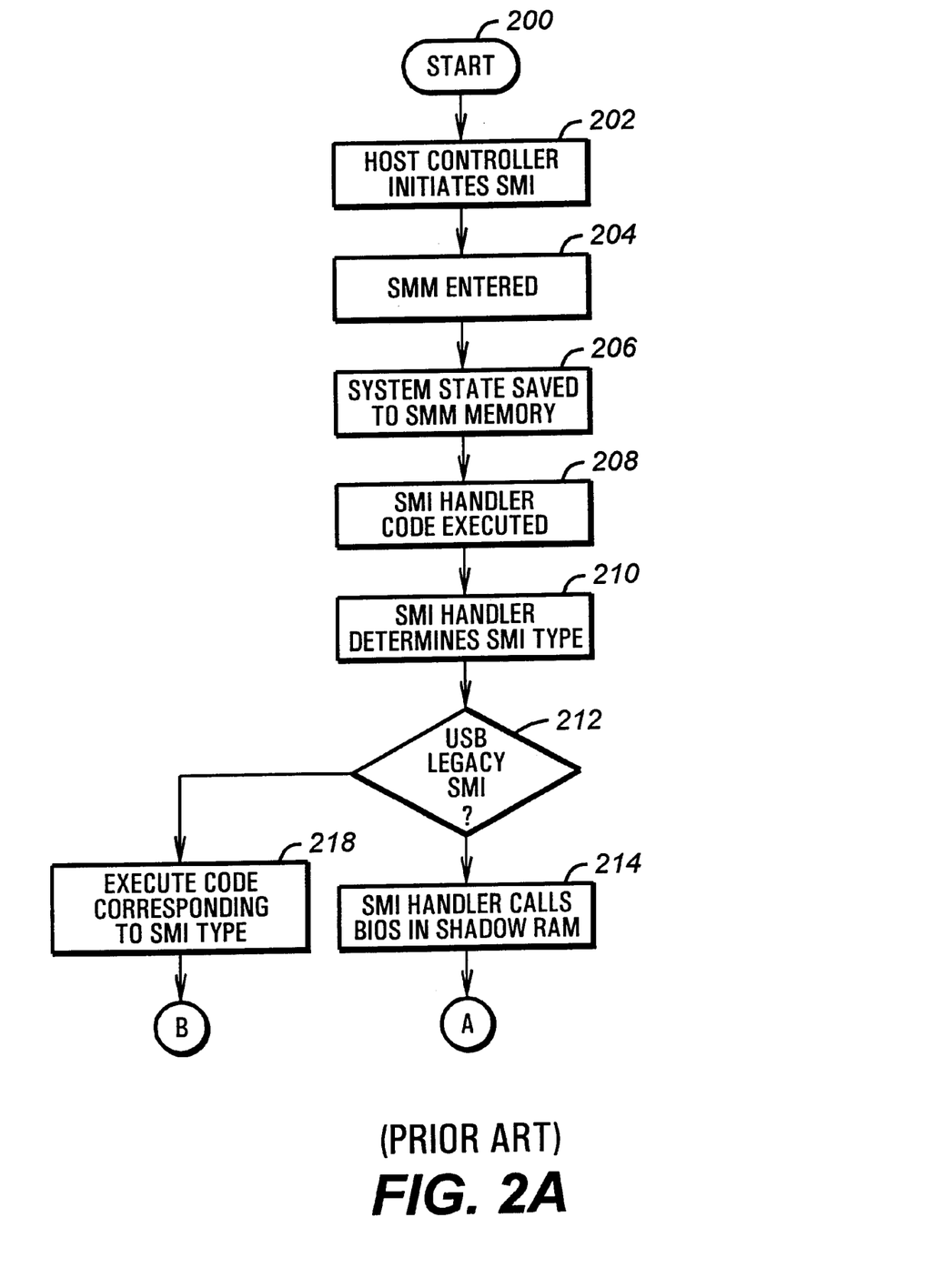
FIGS. 2A–2B are a flow chart of a previous Universal Serial Bus System Management Interrupt implementation.

Turning briefly to FIGS. 2A–2B, a flow chart of the prior USB SMI implementation is shown. In this flowchart, the USB code or other communication protocol code is stored in the shadow RAM portion of the main memory 20 in a conventional manner. A start routine 200 commences with a USB event that triggers an SMI. The USB host controller 25 of the ISA bridge 24 initiates an SMI when a USB event occurs in step 202. Once the processor 32 detects an SMI, the processor 32 places the computer system S in the System Management Mode (SMM) in step 204. The processor 32 then proceeds to save the system state in a CPU state save area 402 (FIG. 4) in step 206. Saving the system state includes, but is not limited to, saving the critical registers to SMM memory 400 (FIG. 4), allowing the processor to restore the computer system S to the pre-SMI condition.

Next in step 208, the SMI handler code 404 (FIG. 4) is executed. The SMI handler 404 then determines the SMI type in step 210. This is typically done via a table-lookup operation. The SMI handler 404 steps through the table consisting of the possible SMIs. The SMI handler 404 addresses the SMI match or matches as it proceeds through the end of the table. Within the table, the SMI handler 404 determines if the SMI is a USB SMI in step 212. If the SMI is not an USB SMI, then the SMI handler 404 proceeds through the table in step 218, executing the appropriate code when the correct SMI is encountered before proceeding to step 220 of FIG. 2B. If the SMI is an USB SMI, control passes to step 214 and the SMI handler 404 calls the USB code residing in the BIOS stored in the shadow RAM.

Figure 2B:
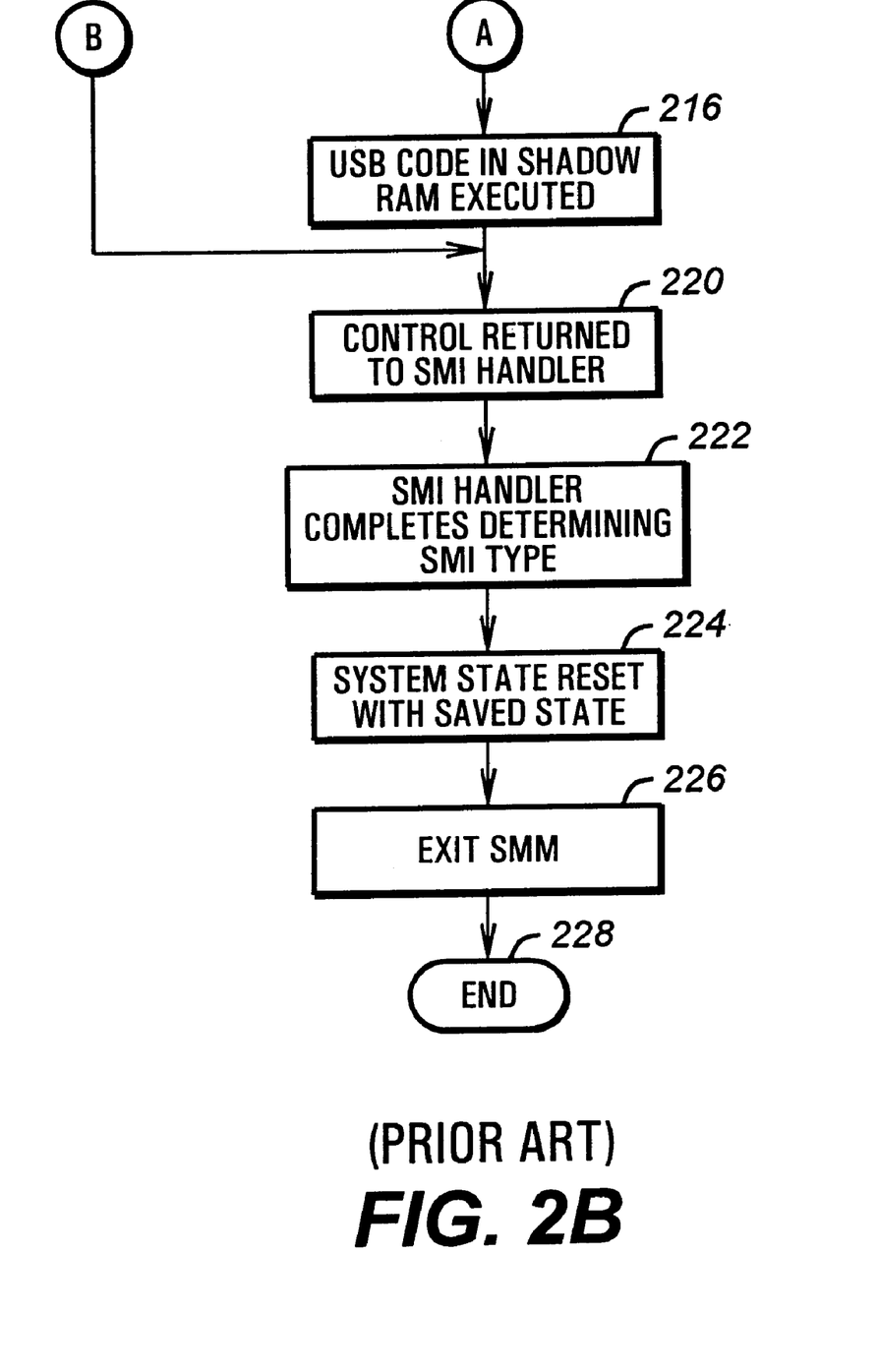
Figure 4:
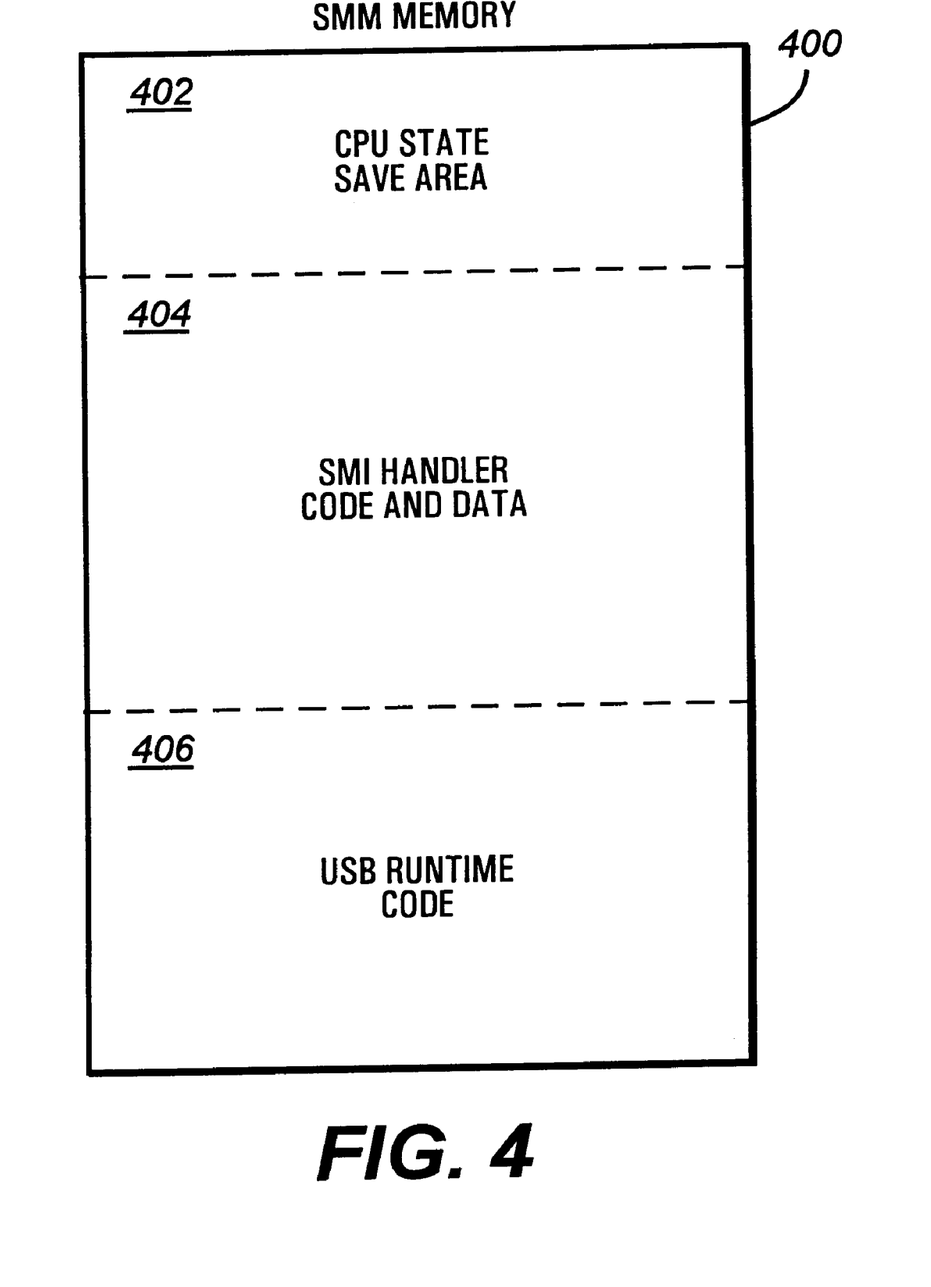
FIG. 4 is a graphic representation of the System Management Mode memory contents according to the present invention.

The USB code in the shadow RAM 20 is executed to address the USB SMI in step 216 of FIG. 2B. Once the USB code is executed, control returns to the SMI handler 404 in step 220. The SMI handler 404 then completes the table-lookup in step 222, executing the appropriate code when necessary to handle any additional SMIs. Completing the table-lookup procedure may add unnecessary time to the execution of the SMI handler 404. Next, in step 224, upon completion of the table-lookup by the SMI handler 404, the processor 32 resets the system state with the data stored in the CPU state save area 402 (FIG. 4). The processor 32 then exits SMM in step 226 and the procedure ends with step 228.

Figure 3A:
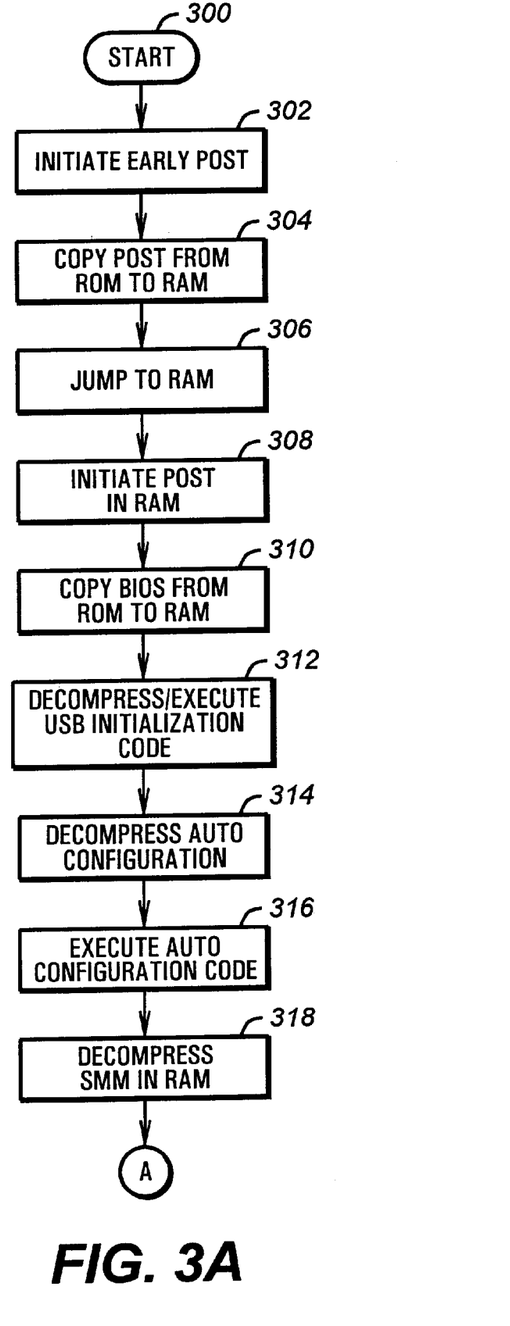
FIGS. 3A–3B are a flow chart of the memory initialization process according to the present invention for the computer system of FIG. 1.

Turning now to FIGS. 3A–3B, a flow chart of an exemplary memory initialization process according to the invention is shown. Beginning with step 300 of FIG. 3A, the computer system is initialized. Next, in step 302, the processor 32 executes the Basic Input/Output System (BIOS) code stored in the flash Read Only Memory (ROM) 78 or other non-volatile memory, beginning with the early power-on-self-test (POST) code. The processor 32 copies a small portion of the BIOS, called the early POST, to the shadow Random Access Memory (RAM) portion of the main memory 20 in step 304. The shadow RAM 20 has faster access times than the flash ROM 78. In step 306, the processor 32 jumps to the shadow RAM 20 and calls the address of the early POST. Next, in step 308, the processor 32 executes the early POST now residing in the shadow RAM 20. The processor 32, executing code in the shadow RAM 20, copies the entire BIOS from the flash ROM 78 to the shadow RAM 20 in step 310. The shadow RAM 20 is mapped to the same address space as the flash ROM 78 and the address space of the flash ROM 78 is masked off. This allows the processor 32 to call the BIOS, without any modification code, and access the BIOS stored in the shadow RAM 20.

Next, in step 312, the processor 32 decompresses the USB initialization code in the BIOS. This step is only necessary if the BIOS is stored in the flash ROM 78 in a compressed state. The processor 32 may only decompress the portion of the BIOS it needs to execute at the time of execution, thus reducing the amount of memory consumed by the BIOS. Then the USB initialization code is executed. This initializes the USB, but does not include the USB runtime code—the code necessary for the processor to implement the communication protocol. The communication protocol in the disclosed embodiment is the USB protocol, however, according to the techniques of the invention, a wide variety of communication protocols could be implemented, including but not limited to a serial bus protocol. In step 314, the processor 32 decompresses the Auto-Configuration code in the BIOS. Next, in step 316, the processor executes the Auto-Configuration code that was decompressed. The Auto-Configuration code addresses and configures the components of the computer system S. The processor 32 then decompresses the SMM code contained in the shadow RAM 20 in step 318 before proceeding to step 320 of FIG. 3B.

Figure 3B:
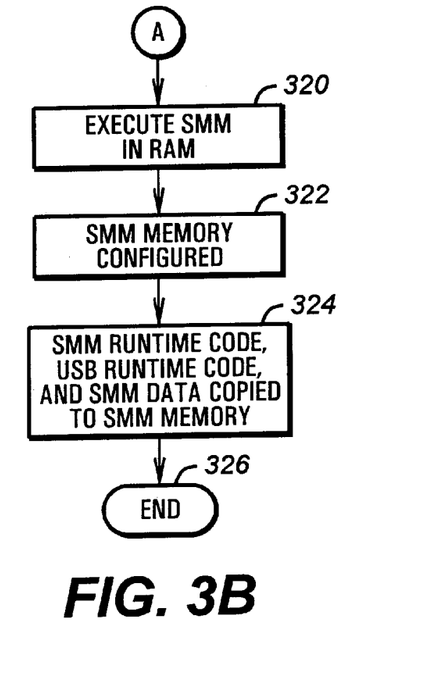

The processor 32 executes the decompressed SMM initialization code in step 320. In step 322, the SMM memory 400 (FIG. 4) is configured by the processor 32 when the SMM initialization code is executed. The SMM memory 400 is isolated from the main memory 20, allowing the SMI handler 404 (FIG. 4) code and SMM data to be stored. Next in step 324, the processor 32 copies the SMM runtime code, USB runtime code, and SMM data to the SMM memory 400 from the shadow RAM 20. Therefore, in the disclosed embodiment, the USB runtime code is resident in the SMM memory and does not consume space in the main memory 20. Initialization process ends in step 326.

Turning to FIG. 4, a graphical representation of SMM memory 400 configured according to the present invention is shown. As known to those skilled in the art, this address space is addressed by the processor 32 following a System Management Interrupt (SMI). Following an SMI, the state of the system is stored in the CPU state save area 402. The system state includes, but is not limited to, the CPU registers and indexing registers. The SMI handler 404 is then called and executed by the processor 32. Importantly, the SMI handler 404 can be written such that it performs tasks other than power-down operations. An SMI handler 404 written according to the present invention is able to determine if the SMI is a Universal Serial Bus (USB) specific SMI. When a USB SMI is received by the SMI handler 404, the SMI handler 404 jumps to another location in SMM memory 400 and executes the USB runtime code 406. The USB runtime code 406, which was moved to SMM memory 400 on the computer system S's initialization, is executed to address the USB SMI.

Figure 5A:
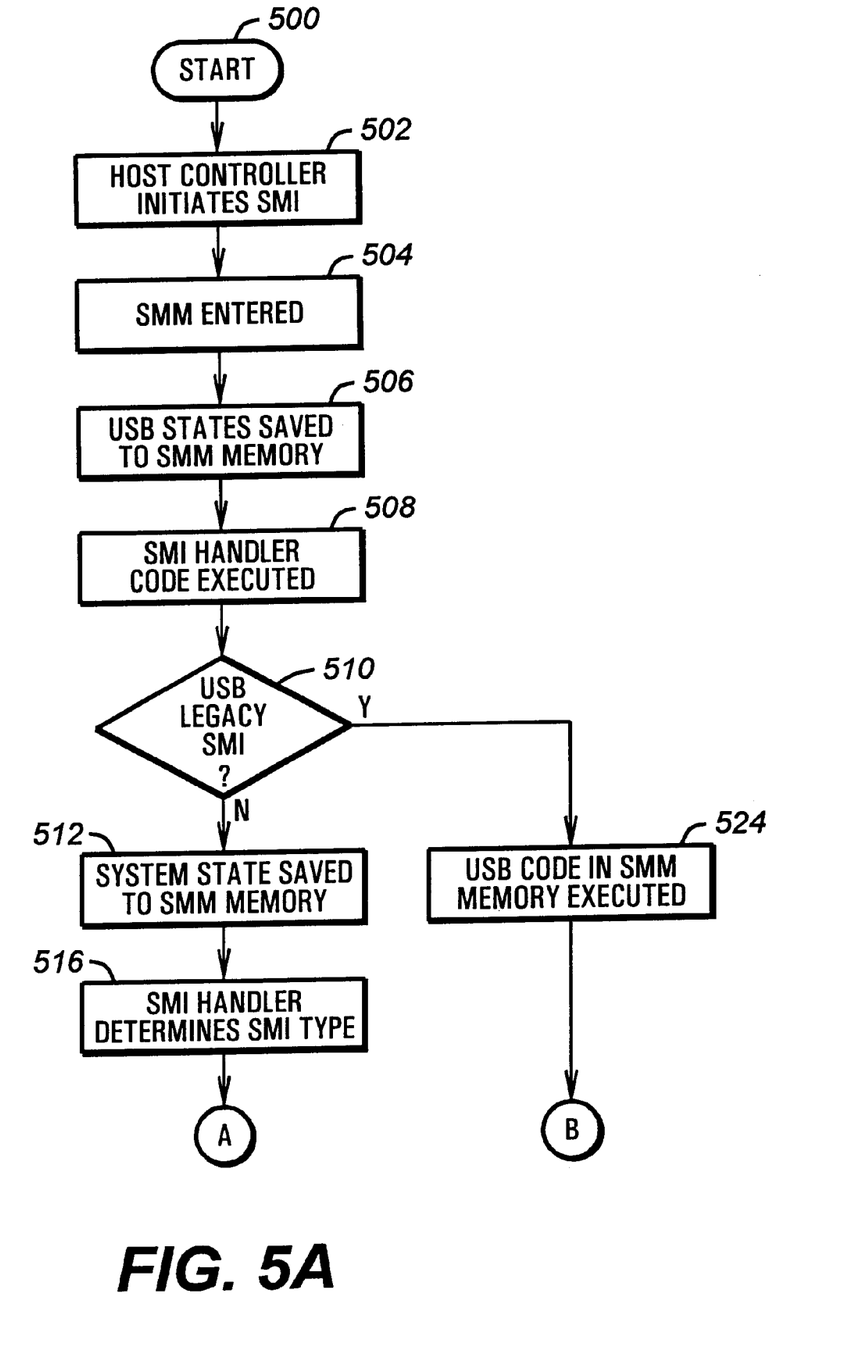
FIGS. 5A–5B are a flow chart of the Universal Serial Bus System Management Interrupt implementation according to the present invention.

Turning now to FIGS. 5A–5B, a flow chart of an exemplary USB SMI implementation according to the present invention is shown. The procedure commences in step 500 following a USB event that triggers an SMI. The USB host controller 25 portion of the ISA bridge 24 initiates an SMI when such a USB event occurs in step 502. Once the processor 32 detects an SMI, the processor 32 places the computer system S in the System Management Mode (SMM) in step 504. The processor 32 then proceeds to save the USB state to the CPU state save area 402 in step 506. The USB state is a subset of the system state and consists of saving the registers that are necessary to address an USB SMI. Next in step 508, the processor 32 executes the SMI handler 404 code. The SMI handler 404 then determines if the SMI is a USB SMI in step 510.

In the disclosed embodiment of the invention, the SMI handler 404 first checks if the SMI is an USB SMI before any other SMI is checked. If the SMI is an USB SMI, the SMI handler 404 jumps to another location in SMM memory and executes the USB runtime code 406 in step 524. The SMI handler 404 does not call the shadow RAM as the USB runtime code was moved to the SMM memory at the computer system S's initialization. Next in step 526 of FIG. 5B, the processor 32 resets the USB state saved to the CPU state saved area 402.

Figure 5B:
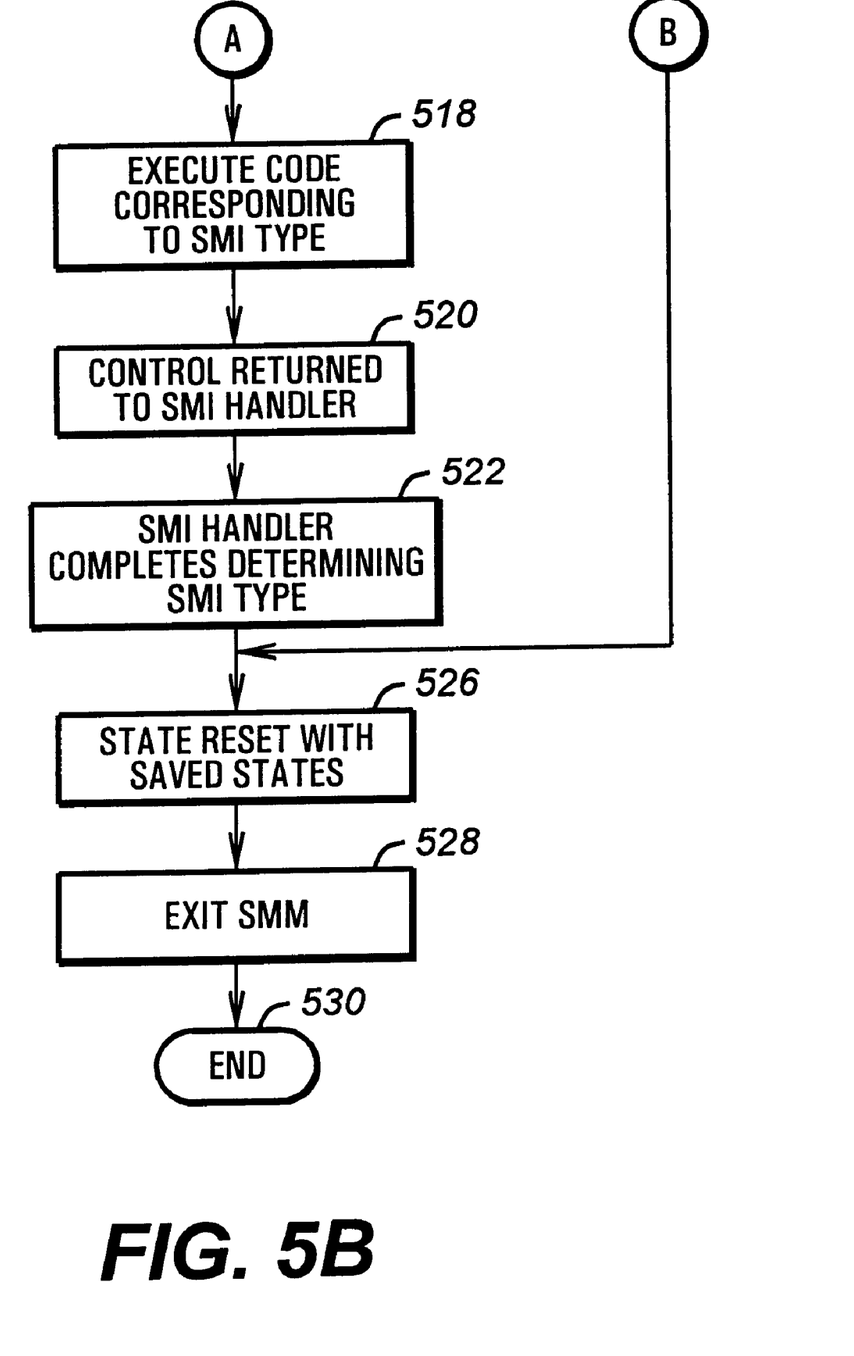

This is done without the SMI handler 404 proceeding through a table to determine the SMI type, thereby speeding execution of the SMI handler 404. The processor 32 then exits the SMM in step 528.

If the SMI is not an USB SMI as determined in step 510, then the processor 32 saves the system state to the CPU state save area 402 in step 512. This includes all critical registers, not just the USB critical registers. Next, in step 516, the SMI handler 404 determines the SMI type using the table-lookup method before executing the appropriate code in step 518 of FIG. 5B. Once the SMI type is determined, the appropriate code to address the SMI is executed in step 518. Upon completion of this code, control is returned to the SMI handler 404 in step 520. Next, the SMI handler 404 completes the SMI table-lookup in step 522. Once the table-lookup is completed, the processor 32 resets the system state from the CPU state save area 402 in step 526. Then the processor exits SMM in step 528 before the process ends with step 530.

Thus a computer system having been described that implements communication support with a minimum amount of main memory. Upon initialization of the computer system, the initialization code is executed, configuring and initializing the communication devices, including a Universal Serial Bus (USB) device. After the initialization, the runtime communication code is moved to a secure memory space, such as System Management Mode (SMM) memory. The runtime communication code is executed in response to a corresponding interrupt to the secure memory, and the computer system preferably exits SMM immediately thereafter.

The foregoing disclosure and description of the invention are illustrative and explanatory thereof, and various changes I the size, shape, materials, components, circuit elements, wiring connections and contacts, as well as in the details of the illustrated circuitry and construction and method of operation may be made without departing from the spirit of the invention.

What is claimed is:

1. A method for implementing communication support with a minimum amount of main memory in a computer system having both a main memory and a secure memory space, the method comprising the steps of:

provided a Basic Input/Output System (BIOS) code for execution in main memory, the BIOS code including a communication code and an initialization code for initializing the computer system;

executing the initialization code to initialize the computer system; and moving the communication code to the secure memory space upon initialization of the computer system.

2. The method of claim 1, wherein the computer system further comprises a nonvolatile memory for storing the BIOS, further comprising the step of:

copying predetermined portions of the BIOS to the main memory prior to executing the initialization code.

3. The method of claim 2, wherein the predetermined portions of the BIOS include the communication code.

4. The method of claim 1, wherein the communication code is essentially compliant with a serial bus protocol.

5. The method of claim 1, wherein the communication code is essentially compliant with the Universal Serial Bus (USB) specification.

6. The method of claim 1, wherein the secure memory is a system management mode memory.

7. The method of claim 1, further comprising the step of executing the communication code in response to a predetermined interrupt event.

8. The method of claim 7, wherein the interrupt event is a system management interrupt, further comprising the step of executing a system management interrupt handler in response to the system management interrupt.

9. The method of claim 8, wherein the step of executing the system management interrupt handler comprises returning the computer system to a normal operating mode immediately following the step of executing the communication code.

10. An apparatus to implement communication support with a minimum amount of main memory in a computer system, the apparatus comprising:
   a secure memory;
   a non-volatile BIOS memory;
   a main memory coupled to the secure memory and the non-volatile BIOS memory for shadowing predetermined portions of the BIOS memory contents; and
   BIOS code residing in the BIOS memory, the BIOS code comprising:
      communication code for implementing a communication protocol; and
      initialization code directing the computer system to move the communication code to the secure memory upon the initialization of the computer system.

11. The apparatus of claim 10, wherein the BIOS code includes the initialization code directing the computer system to move the communication code from the main memory to the secure memory upon the initialization of the computer system.

12. The apparatus of claim 11, wherein the secure memory is system management mode memory.

13. The apparatus of claim 11, further comprising an interrupt generator coupled to the secure memory for generating interrupts to initiate execution of the communication code.

14. The apparatus of claim 13, wherein the interrupt generator generates system management interrupts.

15. The apparatus of claim 11, wherein the communication protocol is essentially compliant with a serial bus protocol.

16. The apparatus of claim 11, wherein the communication protocol is essentially compliant with the USB specification.

17. The apparatus of claim 11, wherein the BIOS memory is a Read Only Memory (ROM).

18. The apparatus of claim 11, wherein the main memory is a Random Access Memory (RAM).

19. A computer system configured to implement communication support with a minimum amount of main memory, the computer system comprising:
   a processor;
   a secure memory coupled to the processor;
   a non-volatile BIOS memory coupled to the secure memory;
   a main memory coupled to the secure memory and the non-volatile BIOS memory for shadowing predetermined portions of the BIOS memory contents;
   BIOS code residing in the BIOS memory for execution by the processor, the BIOS code comprising:
      communication code for implementing a communication protocol; and
      initialization code directing the computer system to move the communication code to the secure memory upon the initialization of the computer system.

20. The computer system of claim 19, wherein the BIOS code includes the initialization code directing the computer system to move the communication code from the main memory to the secure memory upon the initialization of the computer system.

21. The computer system of claim 19, wherein the secure memory is system management mode memory.

22. The computer system of claim 19, further comprising an interrupt generator coupled to the secure memory for generating interrupts to initiate execution of the communication code.

23. The computer system of claim 22, wherein the interrupt generator generates system management interrupts.

24. The computer system of claim 19, wherein the communication protocol is essentially compliant with a serial bus protocol.

25. The computer system of claim 19, wherein the communication protocol is essentially compliant with the USB specification.

26. The computer system of claim 19, wherein the BIOS memory is a Read Only Memory (ROM).

27. The computer system of claim 19, wherein the main memory is a Random Access Memory (RAM).

* * * * *